United States Patent [19]

Ukita et al.

[11] 4,331,795

[45] May 25, 1982

[54] TWO LIQUID TYPE ADHESIVE COMPOSITION COMPRISING A COBALT SALT CURE ACCELERATOR IN ONE PORTION AND A HYDROPEROXIDE WITH AN AROMATIC AMINE AND/OR A PYRIDINE DERIVATIVE CURE ACCELERATOR IN THE SECOND PORTION

[75] Inventors: Kenkichi Ukita; Tatsuo Nakano; Ikuji Kishi, all of Machida, Japan

[73] Assignee: Denki Kagaku Kogyo Kabushiki Kaisha, Tokyo, Japan

[21] Appl. No.: 169,456

[22] Filed: Jul. 16, 1980

[30] Foreign Application Priority Data

Jul. 23, 1979 [JP] Japan .................................. 54-92653

[51] Int. Cl.³ .......................... C08F 4/34; C08F 4/40; C08F 4/70; C09J 3/14
[52] U.S. Cl. .................................... 526/273; 526/147; 526/230; 526/317; 526/318; 526/320; 526/323.2; 526/329; 526/329.1
[58] Field of Search ............... 526/147, 320, 318, 317, 526/230, 273, 323.2, 329.1, 329

[56] References Cited

U.S. PATENT DOCUMENTS

| | | | |
|---|---|---|---|
| 3,773,702 | 11/1973 | Ohashi | 260/33.6 U A |
| 3,890,675 | 3/1975 | Kusayama et al. | 260/32.8 A |
| 4,007,323 | 2/1977 | Malofsky | 526/230 |
| 4,034,145 | 7/1977 | Gruber et al. | 526/230 |

FOREIGN PATENT DOCUMENTS 53-41333  3/1978  Japan .

OTHER PUBLICATIONS

Chem. Abst. 90 (123227v) #16, "Water Thinned Rm. Temp.-Curable Coating Materials", (J78140335) Horii et al.
Derwent Abs. 20543 A/11, Kyoritsu Kasaku San (J53011932), 2-2-1978, "Two Component Liquid Adhesive . . . ".
Derwent Abst. 2747 B/02 ELED (J53135190), 11-2-5-78, ". . . Two Component Liq. Methacrylate Ester Adhesive . . . ".
Derwent Abst. 37587 A/21 ELED (Electro-Chemical Ind. KK) (J53041333), Apr. 14, 1978 "Two Liquid Adhes. Compsn. . . . ".
Derwent Abst. 08805 B/05 ELED (J53144760), "Adhesion . . . Using Two-Component . . . Adhesive", Dec. 16, 1978.
Derwent Abst. 58095 A/32, Denki Kagaku Kogyo [ELED], J78024102 (Jul. 19, 1978), "Two Liq. . . . Adhes. . . . ".
Chem. Abst. vol. 90 (39695p), 1979, "Adhesives Having Good Shrink Resistance During Curing", Sawada et al.

*Primary Examiner*—Herbert J. Lilling
*Attorney, Agent, or Firm*—Oblon, Fisher, Spivak, McClelland & Maier

[57] ABSTRACT

A two liquid type adhesive composition is a combination of Composition A and Composition B both of which comprise an acrylic monomer and a butadiene type oligomer having a terminal ethylenically unsaturated group as major components.

The Composition A further comprises an organic hydroperoxide and an aromatic amine and/or a pyridine derivative and the Composition B further comprises a cobalt salt of organic acid.

9 Claims, No Drawings

TWO LIQUID TYPE ADHESIVE COMPOSITION COMPRISING A COBALT SALT CURE ACCELERATOR IN ONE PORTION AND A HYDROPEROXIDE WITH AN AROMATIC AMINE AND/OR A PYRIDINE DERIVATIVE CURE ACCELERATOR IN THE SECOND PORTION

BACKGROUND OF THE INVENTION

1. Field of the Invention

The present invention relates to a two liquid type adhesive composition. More particularly, it relates to a two liquid type acrylic adhesive composition suitable for bonding a porous or foamed substrate.

2. Description of the Prior Arts

Heretofore, various two liquid type acrylic adhesive compositions have been known. For example, it has been known to combine Composition A comprising a volatile monomer such as methyl methacrylate, paraffin and an organic hydroperoxide as a catalyst and Composition B comprising a thiourea as a hardener. If this is used, however, as an adhesive composition for bonding a porous or foamed substrate, the volatility of methyl methacrylate is too small whereby a bond strength is disadvantageously low.

SUMMARY OF THE INVENTION

It is an object of the present invention to overcome the disadvantages of the known adhesive composition.

It is another object of the present invention to provide a two liquid type adhesive composition which is suitable for bonding a porous or foamed substrate at high bond strength.

The foregoing and other objects of the present invention have been attained by providing a two liquid type adhesive composition having improved adhesive characteristics for bonding a porous or foamed substrate which comprises Composition A comprising an acrylic monomer, a butadiene type oligomer having a terminal ethylenically unsaturated group as major components and an organic hydroperoxide and an aromatic amine and/or a pyridine derivative and Composition B comprising said major components and a cobalt salt of an organic acid.

DETAILED DESCRIPTION OF THE PREFERRED EMBODIMENTS

In the present invention, Composition A and B respectively comprise an acrylic monomer and a butadiene type oligomer having a terminal ethylenically unsaturated group as major components, and Composition A further comprises an organic hydroperoxide and an aromatic amine and/or a pyridine derivative, and Composition B further comprises a cobalt salt of an organic acid.

The acrylic monomers used in the present invention include acrylic acid, methacrylic acid and esters thereof. Suitable acrylic or methacrylic ester monomers include mono(metha)acrylates such as
methyl acrylate, ethyl acrylate, propyl acrylate, butyl acrylate,
methyl methacrylate, ethyl methacrylate, butyl methacrylate,
2-ethylhexyl methacrylate, lauryl methacrylate,
2-hydroxypropyl methacrylate, 2-hydroxyethyl methacrylate and glycidyl methacrylate; and poly(metha)acrylates such as polyethyleneglycol dimethacrylate, polypropyleneglycol dimethacrylate, 4,4-dimethacryloxyethoxy diphenylpropane and trimethylolpropane trimethacrylate.

The butadiene type oligomers having a terminal ethylenically unsaturated group used in the present invention are preferably polymers having butadiene unit as a major component and having a number average molecular weight of about 1,000 to 10,000 and having a terminal ethylenically unsaturated group such as $CR_1H=CR_2-$ or $CR_1H=CR_2-COO-$, wherein $R_1$ represents hydrogen atom or carboxylic group; and $R_2$ represents hydrogen atom or methyl group.

The oligomers include not only homo-polymers of butadiene but also copolymers of butadiene and another comonomer such as isoprene, styrene, methyl styrene or acrylonitrile.

The butadiene type oligomers having a terminal ethylenically unsaturated group used in the present invention can be a terminal acrylic or methacrylic modified butadiene oligomer having a terminal group of $CH_2=CH-COO-$ or

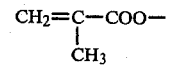

or a terminal halfester butadiene oligomer having a terminal group of $HOOC-CH=CH-COO-$ or a terminal vinyl modified acrylonitrile-butadiene oligomer having a terminal group of $CH_2=CH-$ or a terminal vinyl modified styrene-butadiene oligomer having a terminal group of $CH_2=CH-$.

These oligomers can be obtained by an esterification of the butadiene type oligomer having a terminal hydroxy group with unsaturated carboxylic acid such as acrylic acid or methacrylic acid; or a reaction of an unsaturated compound having hydroxy group such as 2-hydroxyethyl methacrylate with the residual isocyanate group of the reaction of an excess of polyisocyanate with the butadiene type oligomer having a terminal hydroxy group; or a reaction of an unsaturated compound having an epoxy group such as glycidyl methacrylate with the butadiene type oligomer having a terminal carboxylic group.

A ratio of the butadiene type oligomer to the acrylic monomer as the major components is usually in a range of 90 to 40:10 to 60% by weight preferably 85 to 60:15 to 40% by weight.

When a ratio of the oligomer in the solution is higher, the surface hardening rate is higher whereas a viscosity is too high to remarkably deteriorate processibility, and the bond strength is lower.

The organic hydroperoxides used in the present invention can be compounds useful as a radical polymerization initiator such as cumene hydroperoxide (CHP), para-methane hydroperoxide, diisopropylbenzene dihydroperoxide, and t-butyl hydroperoxide.

The aromatic amines used in the present invention can be toluidine, dimethyl toluidine, N,N-di(2-hydroxyethyl)-p-toluidine, aniline, dimethyl aniline and N-phenyl morpholine.

The pyridine derivatives used in the present invention can be pyridine, $\alpha,\alpha'$-dipyridyl, oxine and orthophenanthroline.

When N,N-di(2-hydroxyethyl)-p-toluidine is used as the aromatic amine, the stability of Composition A comprising an organic hydroperoxide is remarkably improved.

The cobalt salts of an organic acid used in the present invention can be cobalt naphthenate, cobalt 2-ethylhexylate and cobalt acetate.

An amount of the organic hydroperoxide and an amount of the cobalt salt of an organic acid are respectively in a range of 0.5 to 10 wt. parts per 100 wt. parts of the major component.

An amount of the aromatic amine and the pyridine derivative is preferably in a range of 0.05 to 5 wt. parts per 100 wt. parts of the major component. When it is less than the range, the hardening rate is too late whereas when it is more than the range, the hardening rate is not effectively increased.

In the two liquid type adhesive composition of the present invention, it is possible to incorporate various known additives such as fillers, plasticizers, coloring agents and paraffin as desired for the purpose.

The two liquid type adhesive composition of the present invention is effective for bonding non-porous substrates such as metallic substrate as well as porous substrates such as wood, paper or certain ceramics at high hardening rate with high bond strength.

The two liquid type adhesive composition of the present invention is especially useful for assembly of a speaker which is prepared by bonding porous substrates such as a damper, a cone paper, edge parts and a gasket. In order to bond said porous substrates of the speaker, rubber solution type adhesive compositions and epoxy type adhesive compositions have been used. The rubber solution type adhesive compositions have disadvantages of the incorporation of a solvent and slow hardening rate to impart required bond strength and the epoxy type adhesive compositions have disadvantages of the requirement of measurement and mixing two liquid compositions and the requirement of long hardening time at the ambient temperature.

In accordance with the present invention, the adhesive composition can be hardened on a surface of a porous substrate such as the parts of the speaker only for less than several minutes to impart great bond strength.

The present invention will be further illustrated by certain examples and references. The term of part means part by weight.

EXAMPLE 1

1,2-Polybutadiene having methacrylic modified terminal groups (number average molecular weight of 2,600) (NISSO-PB TE-2000 manufactured by Nippon Soda K.K.) (hereinafter referring to as TE-2000) and 2-hydroxyethyl methacrylate (hereinafter referring to as 2HEMA) at a ratio of 60:40 by weight were charged into a beaker and the mixture was stirred at 20° C. for 1 hour to obtain a uniform solution for the major components.

Each Composition A was prepared by admixing 100 wt. parts of the major components with cumene hydroperoxide and each aromatic amine or pyridine derivative shown in Table 1.

Each Composition B was prepared by admixing 100 wt. parts of the major components with a cobalt salt of an organic acid shown in Table 2.

TABLE 1

| Composition A | | Amount of CHP (part by weight) | Aromatic amine or pyridine derivative | |
|---|---|---|---|---|
| | | | Kind | Amount |
| Example 1 | No. 1 | 2 | PDMT | 0.2 |
| | No. 2 | 2 | " | 0.4 |
| | No. 3 | 1 | " | 0.4 |
| | No. 4 | 1 | DP | 0.5 |
| | No. 5 | 1 | " | 1.0 |
| | No. 6 | 1 | oxine | 0.5 |
| Reference 1 | No. 7 | 1 | — | — |
| | No. 8 | 0 | PDMT | 0.4 |

Note:
CHP: cumene hydroperoxide
PDMT: para-dimethyltoluidine
DP: α,α'-dipyridyl

TABLE 2

| Compositon B | | Cobalt salt of organic acid (part by weight) | |
|---|---|---|---|
| | | Kind | Amount |
| Example 1 | No. 1 | cobalt naphthenate | 1.0 |
| | No. 2 | cobalt 2-ethylhexylate | 1.0 |
| Reference 1 | No. 3 | ethylene thiourea | 1.0 |

Each Composition A and each Composition B at the same ratio by weight were respectively coated and mixed on an iron plate to bond iron plates at the ambient temperature and aged for 24 hours. Each tensile shear strength at the same temperature was measured, and each surface hardening property of the adhesive composition exposed in air was also measured.

Each Composition A and each Composition B at the same ratio by weight were respectively coated and mixed on an iron substrate and each set time was measured. The results are shown in Table 3.

The surface hardening property was shown by the symbol O in the case of non-tackiness and the symbol X in the case of tackiness.

TABLE 3

| Sample | | Tensile shear strength (kg/cm²) | Set time (min.) | Surface hardening property |
|---|---|---|---|---|
| Composition A | Composition B | | | |
| No. 1 | No. 1 | 212 | 7–8 | O |
| No. 2 | " | 234 | 6–7 | O |
| No. 3 | " | 203 | 7–8 | O |
| No. 4 | " | 168 | 3–4 | O |
| No. 5 | " | 179 | 1–2 | O |
| No. 6 | " | 100 | 5–6 | O |
| No. 7 | " | 162 | >60 | O |
| No. 8 | " | 13 | >60 | X |
| No. 5 | No. 2 | 154 | 1–2 | O |
| " | No. 3 | 140 | 10–15 | X |

EXAMPLE 2

1.2-Polybutadiene having methacrylic modified terminal groups (TE-2000) used in Example 1 and methyl methacrylate (MMA), triethyleneglycol dimethacrylate (3G) and 2-hydroxypropyl methacrylate (2HPMA) at each ratios shown in Table 4 were mixed by the process of Example 1 to prepare each major components.

Each Composition A was prepared by admixing 100 wt. parts of the major components with 2 wt. parts of cumene hydroperoxide and 0.4 wt. part of dimethyltoluidine.

Each Composition B was prepared by admixing 100 wt. parts of the major components with 1 wt. part of cobalt naphthenate.

TABLE 4

| | | (part by weight) | |
|---|---|---|---|
| | TE-2000 | Acrylic monomer | |
| Sample | Amount | Kind | Amount |
| Composition No. 9 | 50 | MMA | 50 |
| A       No. 10 | 75 | 3G | 25 |
|         No. 11 | 75 | 2HPMA | 25 |
| Composition No. 4 | 50 | MMA | 50 |
| B       No. 5 | 75 | 3G | 25 |
|         No. 6 | 75 | 2HPMA | 25 |

In accordance with the tests of Example 1, the physical properties of the adhesive compositions were measured. The results are shown in Table 5.

TABLE 5

| Composition A | Composition B | Tensile shear strength (kg/cm$^2$) | Set time (min.) | Surface hardening property |
|---|---|---|---|---|
| No. 9 | No. 4 | 213 | 7–8 | O |
| No. 10 | No. 5 | 165 | 5–6 | O |
| No. 11 | No. 6 | 203 | 6–7 | O |

EXAMPLE 3

Polyacrylonitrile-butadiene copolymer having vinyl terminal groups (number average molecular weight of about 3500) (Hycar VTBN manufactured by Goodrich Co.) (VTBN) or halfester of poly 1,2-butadiene having HOOC—CH=CH—COO— group at terminals (number average molecular weight of about 2,200) (NISSO-GM manufactured by Nippon Soda Co.) (GM) was used as the butadiene type oligomer having ethylenically unsaturated terminal group.

In accordance with the process of Example 1, 75 wt. parts of each oligomer, 7.5 wt. parts of methyl methacrylate and 17.5 wt. parts of 2-hydroxyethyl methacrylate were mixed to prepare the major components for Compositions A and B.

Composition A was prepared by admixing 100 wt. parts of the major components with 2 wt. parts of CHP and 0.4 wt. part of dimethyltoluidine. Composition B was prepared by admixing 100 wt. parts of the major components with 1 wt. part of cobalt naphthenate.

In accordance with the tests of Example 1, the physical properties of the adhesive composition of the combination of Compositions A and B were measured. The results are shown in Table 6.

TABLE 6

| Oligomer | Tensile shear strength (kg/cm$^2$) | Set time (min.) | Surface hardening property |
|---|---|---|---|
| VTBN | 95 | 6–7 | O |
| GM | 60 | 9–10 | O |

EXAMPLE 4

Major components for Compositions A and B were prepared by admixing 60 wt. parts of 1,2-polybutadiene having methacryl modified terminal groups (TE-2000) with 40 wt. parts of 2-hydroxyethyl methacrylate.

Composition A was prepared by admixing 100 wt. parts of the major components with 1 wt. part of cumene hydroperoxide and 1 wt. part of dimethyltoluidine. Composition B was prepared by admixing 100 wt. parts of the major components with 5 wt. parts of cobalt naphthenate.

The two liquid type adhesive composition was used for an assembly of a magnet and plates of a speaker. After 10 minutes at the room temperature, holders could be deassembled.

The adhesive composition was used for bonding vibrating parts of a speaker; and also a vibrating part and a frame of the speaker. After 10 minutes at the room temperature, each strength of the bonded parts reached to the satisfactory strength. The adhesive composition was also used for bonding a damper and a voice coil; and a voice coil and a cone paper; and a cone paper and a frame; a cone paper and a gasket; and a damper and a frame of the speaker. When each bonded parts were peeled after 10 minutes, the substrate itself was broken in each case. When the bonding operation was carried out at 50° C., each strength of the bonded parts reached to the satisfactory strength within 4 to 5 minutes.

REFERENCE 2

A rubber type adhesive composition "Diabond AC101D" (manufactured by Nogawa Chemical) was used for bonding a vibrating parts of a speaker; and also a vibrating part and a frame of the speaker. It took about 3 to 4 hours to reach the minimum bond strength for breaking the substrate.

REFERENCE 3

A two liquid type acrylate adhesive composition of combination of Compounds A and B shown in Table 7 was prepared and used for bonding vibrating parts of a speaker and a vibrating part and a frame of the speaker. The substrate was not broken in each case after 30 minutes. A set time of the adhesive composition was about 4 to 5 minutes.

TABLE 7

| | (part by weight) | |
|---|---|---|
| | Composition A | Composition B |
| Carboxylated NBR[1] | 16 | 16 |
| Methyl methacrylate | 42 | 42 |
| 2-Hydroxyethyl methacrylate | 42 | 42 |
| Cumene hydroperoxide | 5 | — |
| Ethylene thiourea | — | 1 |
| Parrafin wax | 0.5 | 0.5 |

Note:
[1]Elastomer of acrylonitrile-butadiene-(metha)acrylic acid copolymer having Mooney viscosity of 45.

The tests in the examples were carried out by the following test methods otherwise specified.
(1) Tensile shear strength:
ASTM-D-1002-64 (speed of 10 mm/min.)
(2) Set time:
The adhesive composition was coated and mixed on iron substrates as test pieces for an area of 1 inch$^2$ at the ambient temperature to bond them. The time needed for non-movement of the test pieces under a tensile load of 5 kg. was measured.
(3) Surface hardening property:
The adhesive composition was coated and mixed on an iron substrate as a test piece and tackiness of the surface was tested by finger touch.

EXAMPLE 5

A transparent viscous liquid was prepared by uniformly mixing 60 wt. parts of 1,2-polybutadiene having methacrylate modified terminal groups (NISSO-PB TE-2000) and 40 wt. parts of 2-hydroxyethyl methacrylate. The transparent viscous liquid was divided into two parts.

Composition A was prepared by admixing 100 wt. parts of the transparent viscous liquid with the additivies shown in Table 8.

Composition B was prepared by admixing 100 wt. parts of the transparent viscous liquid with the additives shown in Table 9. Compositions B-2 and B-3 are used for references.

TABLE 8

|  | Composition | | |
|---|---|---|---|
|  | A-1 | A-2 | A-3 |
| Cumene hydroperoxide (wt. part) | 1.0 | 1.0 | 1.0 |
| N,N-dimethyl-p-toluidine (wt. part) | 0.5 | — | — |
| N,N-di(2-hydroxyethyl)-p-toluidine (wt. part) | — | 1.0 | — |

TABLE 9

|  | Composition | | |
|---|---|---|---|
|  | B-1 | B-2 | B-3 |
| Cobalt 2-ethylhexanate (wt. part) | 2.5 | 2.5 | 2.5 |
| N,N-dimethyl-p-toluidine (wt. part) | — | 0.5 | — |
| N,N-di(2-hydroxyethyl)-p-toluidine (wt. part) | — | — | 1.0 |

Each set was measured by using each adhesive composition of combination of Compositions A and B. The results are shown in Table 10.

TABLE 10

| Composition A | Composition B | Set time (min. at 24° C.) |
|---|---|---|
| A-1 | B-1 | 5.5 |
| A.2 | B-1 | 5.5 |
| A-3 | B-1 | 120.0 |
| A-3 | B-2 | 8.0 |
| A-3 | B-3 | 9.0 |

In each 20 ml. bottle, 15 g. of each sample of Composition A and Composition B was charged and stored in an oven at 40° C. The change of the sample was observed. The results are shown in Table 11.

TABLE 11

| Composition | Stability |
|---|---|
| A-1 | gelation after 36 hours |
| A-2 | small gelation at bottom after 2 weeks |
| A-3 | small gelation at bottom after 1 month |
| B-1 | ring type film at surface after 1 month |
| B-2 | hardening for about ½ of upper part after 24 hours |
| B-3 | film at surface after 48 hours |

We claim:

1. In a two liquid adhesive composition which is a combination of component A and component B both of which comprise a butadiene oligomer having a terminal ethylenically unsaturated group and an acrylic monomer as major components in a ratio on a percentage basis ranging from 90 to 40:10 to 60, the improvement comprising:
said component A further comprising an organic hydroperoxide and an aromatic amine and/or a pyridine derivative and said component B further comprising a cobalt salt of an organic acid.

2. The adhesive composition according to claim 1 wherein a number average molecular weight of said oligomer is in a range of about 1,000 to 10,000.

3. The adhesive composition according to claim 1 wherein said oligomer is acrylic or methacrylic modified butadiene oligomer.

4. The adhesive composition according to claim 1 wherein said oligomer is acrylic or methacrylic modified 1,2-butadiene oligomer.

5. The adhesive composition according to claim 1 wherein hydroperoxide is cumene hydroperoxide.

6. The adhesive composition according to claim 1 wherein said aromatic amine include N,N-di(2-hydroxyethyl)-p-toluidine.

7. The adhesive composition according to claim 1 wherein an amount of said organic hydroperoxide is in a range of 0.5 to 10 parts by weight per 100 parts by weight of said major components.

8. The adhesive composition according to claim 1 wherein an amount of said cobalt salt of organic acid is in a range of 0.5 to 10 parts by weight per 100 parts by weight of said major components.

9. The adhesive composition according to claim 1 wherein an amount of said aromatic amine and/or said pyridine derivative is in a range of 0.05 to 5 parts by weight per 100 parts by weight of said major components.

* * * * *